US009049358B2

(12) United States Patent
Miller

(10) Patent No.: US 9,049,358 B2
(45) Date of Patent: Jun. 2, 2015

(54) CAMERA EXTENSION APPARATUS AND METHOD USING A SWITCH FOR TAKING PICTURES AT A DISTANCE FROM A USER

(71) Applicant: David Chris Miller, Bradenton, FL (US)

(72) Inventor: David Chris Miller, Bradenton, FL (US)

(73) Assignee: EXTEND-N-CLICK, LLC, Lakewood Ranch, FL (US)

( * ) Notice: Subject to any disclaimer, the term of this patent is extended or adjusted under 35 U.S.C. 154(b) by 0 days.

(21) Appl. No.: 14/210,560

(22) Filed: Mar. 14, 2014

(65) Prior Publication Data

US 2015/0077630 A1      Mar. 19, 2015

Related U.S. Application Data

(60) Provisional application No. 61/879,344, filed on Sep. 18, 2013.

(51) Int. Cl.
| | | |
|---|---|---|
| *H04N 5/225* | (2006.01) | |
| *H04M 1/02* | (2006.01) | |
| *G03B 17/56* | (2006.01) | |
| *F16M 11/26* | (2006.01) | |

(52) U.S. Cl.
CPC ........... *H04N 5/2251* (2013.01); *H04N 5/2252* (2013.01); *H04M 1/0252* (2013.01); *H04M 1/0249* (2013.01); *G03B 17/56* (2013.01); *F16M 11/26* (2013.01)

(58) Field of Classification Search
CPC . H04N 5/2251; H04N 5/2252; H04N 5/2253; H04N 5/2254; H04N 5/2257; H04N 5/2259; H04N 5/228; H04N 2201/02466; H04N 2201/2468; H04N 2201/0247; H04N 2201/02472; H04N 2201/02474; H04N 2201/02477; H04N 2201/02479; H04N 2201/02481; H04N 2201/02483; H04N 2201/02485; H04M 1/0249; H04M 1/0252; H04M 1/026; H04M 1/0264; G03B 29/00
See application file for complete search history.

(56) References Cited

U.S. PATENT DOCUMENTS

| | | | | |
|---|---|---|---|---|
| 2,322,945 | A | | 6/1943 | Liabastre |
| 4,530,580 | A | | 7/1985 | Ueda et al. |
| 5,065,249 | A | * | 11/1991 | Horn et al. ................. 348/376 |
| 5,305,356 | A | * | 4/1994 | Brooks et al. ............. 376/249 |
| 5,742,859 | A | * | 4/1998 | Acker ........................ 396/419 |
| 6,091,453 | A | * | 7/2000 | Coan et al. ................. 348/373 |
| 6,384,863 | B1 | * | 5/2002 | Bronson .................... 348/373 |
| 6,956,616 | B2 | * | 10/2005 | Jung et al. ................. 348/376 |
| 7,292,881 | B2 | * | 11/2007 | Seil et al. ................. 455/575.1 |
| 7,684,694 | B2 | | 3/2010 | Fromm |
| 7,706,673 | B1 | * | 4/2010 | Staudinger et al. ......... 396/58 |
| 8,002,480 | B2 | * | 8/2011 | Polster ....................... 396/425 |

(Continued)

OTHER PUBLICATIONS

ISA/US International Search Report for International Patent Application No. PCT/US14/52487 dated Dec. 5, 2014.

*Primary Examiner* — Pritham Prabhakher
(74) *Attorney, Agent, or Firm* — Shumaker, Loop & Kendrick, LLP

(57) ABSTRACT

The invention is a camera holder extension that includes a telescoping extension to allow a user to take photos at a distance beyond the reach of the user. The invention includes an actuator switch, located in the handle of the extension, which is wired to be in communication with a digital camera integrated device. The actuator switch operates the exposure function of the camera at the distance beyond the reach of the user via a wired digital connection to the device. The invention also includes a lockable two part ball joint that enables articulation of the camera into various positions.

18 Claims, 10 Drawing Sheets

(56) References Cited

U.S. PATENT DOCUMENTS

| | | | |
|---|---|---|---|
| 8,325,235 B1* | 12/2012 | Tan | 348/169 |
| 8,354,934 B2* | 1/2013 | Walker et al. | 340/611 |
| 8,393,584 B2* | 3/2013 | Burns | 248/121 |
| 8,506,180 B2* | 8/2013 | Brown | 396/421 |
| 8,757,901 B2* | 6/2014 | Fromm | 396/428 |
| 2004/0023633 A1* | 2/2004 | Gordon | 455/345 |
| 2006/0257137 A1* | 11/2006 | Fromm | 396/420 |
| 2006/0257138 A1* | 11/2006 | Fromm | 396/420 |
| 2007/0053680 A1 | 3/2007 | Fromm | |
| 2007/0177866 A1* | 8/2007 | Fujimoto | 396/376 |
| 2008/0117328 A1 | 5/2008 | Daoud et al. | |
| 2009/0033492 A1* | 2/2009 | Rapp et al. | 340/568.8 |
| 2010/0259619 A1* | 10/2010 | Nicholson | 348/158 |
| 2010/0301188 A1* | 12/2010 | Schimelfenyg | 248/447.2 |
| 2012/0276954 A1* | 11/2012 | Kowalsky | 455/556.2 |
| 2014/0037281 A1* | 2/2014 | Carney | 396/421 |
| 2014/0209777 A1* | 7/2014 | Klemin et al. | 248/544 |
| 2015/0029352 A1* | 1/2015 | Burciaga | 348/211.99 |

* cited by examiner

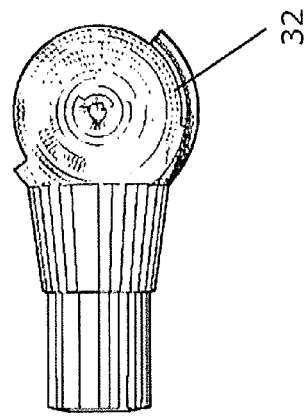
Fig. 11
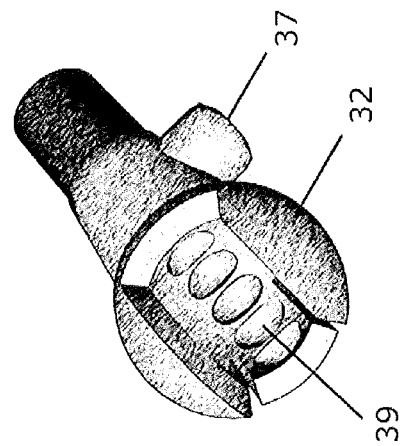
Fig. 14
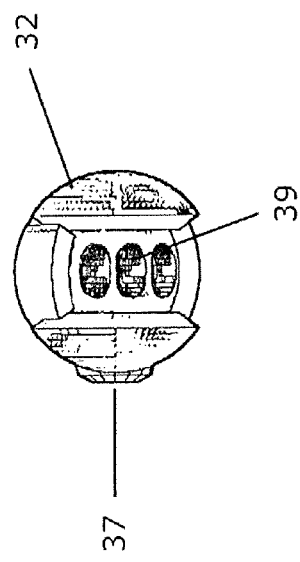
Fig. 10
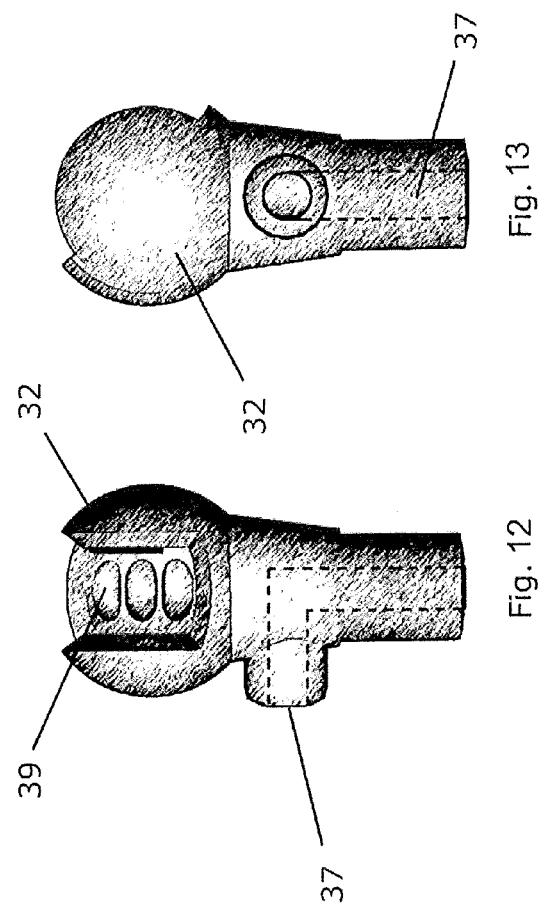
Fig. 13
Fig. 12

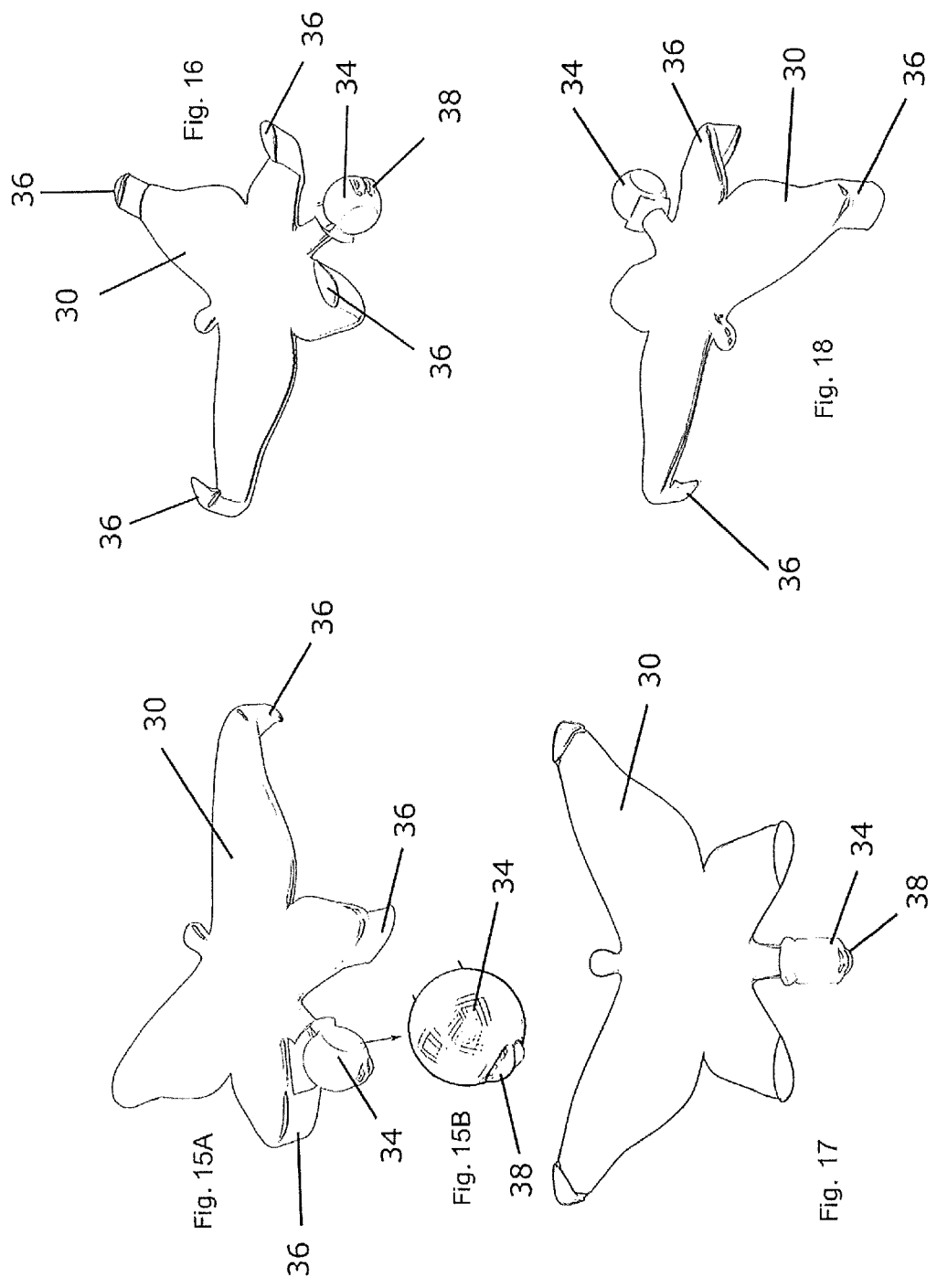

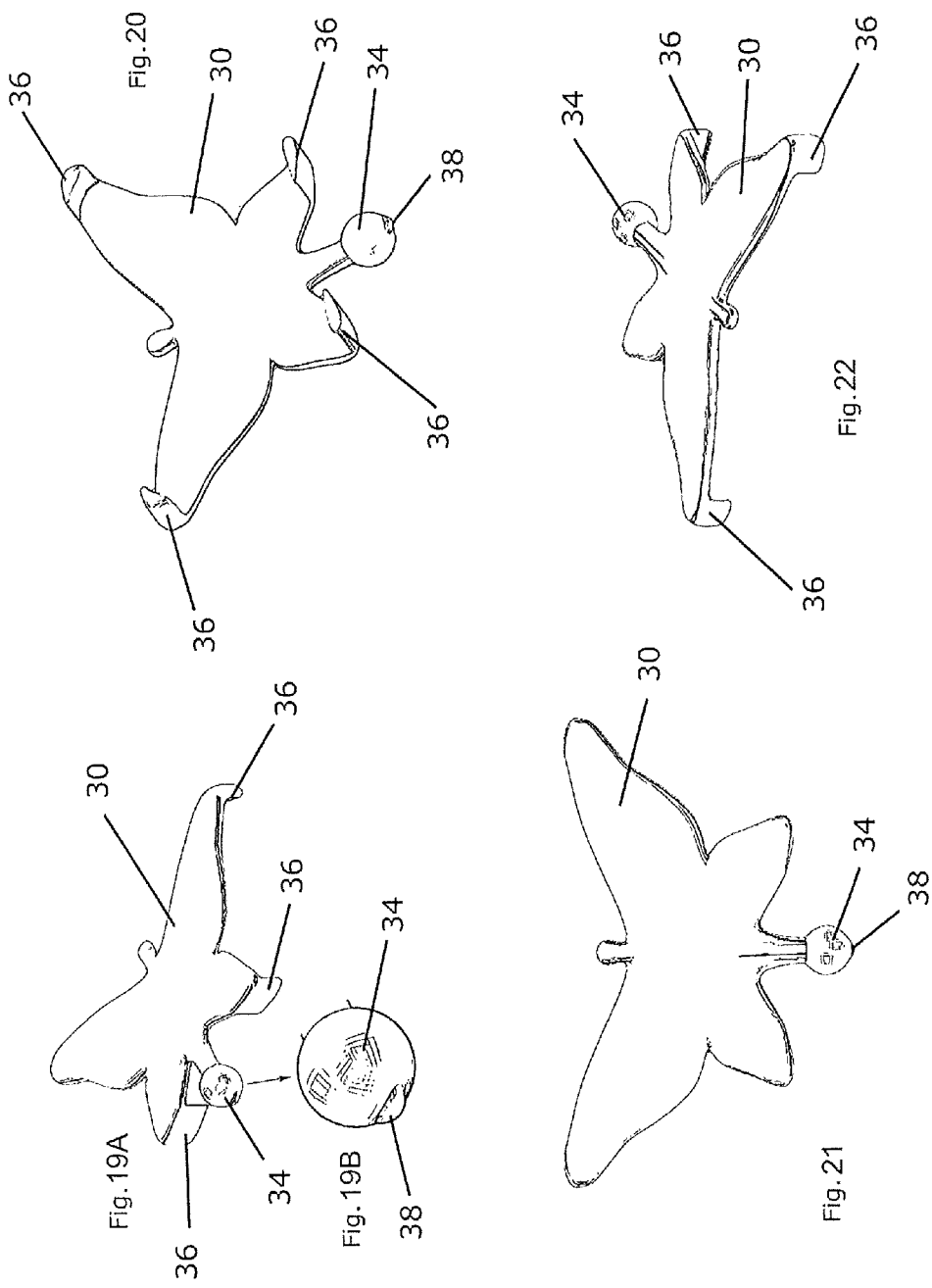

CAMERA EXTENSION APPARATUS AND METHOD USING A SWITCH FOR TAKING PICTURES AT A DISTANCE FROM A USER

RELATED APPLICATIONS

This application is a non-provisional application of, claims priority from, and incorporates by reference, U.S. Provisional Patent Application No. 61/879,344 filed on Sep. 18, 2013.

TECHNICAL FIELD AND BACKGROUND OF THE INVENTION

The present invention relates generally to the field of auxiliary camera equipment, and, more particularly, to the field of camera support devices. Even more particularly, the present invention is in the technical field of telescopic monopod digital camera supports.

The field of telescopic monopod camera supports includes devices designed to support a camera at a distance from a photographer. Current extension handle products such as the "Quickpod" brand of telescopic monopods are designed to be used with the camera device's self-timer function or an additional remote control device. Such existing monopod extension technology does not allow the user to take photos or start and stop video at will without an external trigger device or drawing the unit back to the user and resetting the timer for each photo. Such units are dependent on a self-timer which may not take a picture or video that will capture the image at the correct moment. Also, users desire the ability to take multiple photos at will during random intervals, which is impossible with existing hand held monopods. Additionally, most current devices are built to be used with stand-alone camera and do not have the ability to be used with an iPhone, iPod, or similar camera integrated digital device. The few devices that do contemplate use with an iPhone, iPod, or similar camera integrated digital device do not include a wired shutter actuator and rely on remote control such as via a Bluetooth connection.

Further, frequently people are using digital devices with integrated cameras and current monopod products have not kept pace with the available features of these devices. Users of these products become frustrated with the inability to trigger the camera at will because current extension products do not have the capability of triggering the camera directly through the hand held extension apparatus. They must retract the camera and manually reset the timer or start and stop video recording each time they wish to record an image. Or, in case of a Bluetooth equipped connection, must establish a radio connection between the camera device and any compatible actuator.

Thus, there is a need in the art for a camera extension device that provides an integrated manually activated direct wired switch that triggers the digital camera from the handle of a telescopic monopod.

SUMMARY OF THE INVENTION

Therefore, it is an object of the invention to provide a camera extension device that provides an integrated manually activated direct wired switch that triggers the digital camera from the handle of a telescopic monopod.

It is an object of the invention to provide a camera extension that allows the user to take pictures at a greater distance from the user than their physical limitations allow, while retaining the ability to take the picture at will rather than relying on the self-timer function of the camera or external remote control device. This enables the user to capture unique self-portraits or unobstructed views or views that would not normally be available due to physical limitations, while giving the user complete control of timing without the use of external components to actuate the camera.

It is a further object of this invention to provide a telescopic monopod device with the capability of holding an iPhone, iPod, or other digital camera device that will allow the user to trigger the camera or video function of the device directly from the hand grip of the monopod.

These and other objects and advantages of the invention are achieved by providing a telescoping camera extension apparatus that may be actuated by a user at a distance from the camera via a wired connection to the camera. The camera extension apparatus includes a two part handle housing a momentary actuator switch operably connected to a single circuit board. The apparatus includes a telescoping extension, attached to the two part handle and partially housed within the two part handle, extending from a collapsed position mostly within the two part handle to a fully extended position. The apparatus also includes a camera holder, having a plurality of holder edges sufficient to secure the digital camera integrated device at its edges and a multi-position ball joint connecting the camera holder to the telescoping extension and comprising a male portion of the ball joint attached to the camera holder and a female portion of the ball joint attached to the telescoping extension. The apparatus also includes a wire extending from the circuit board through a hollow portion of the telescoping extension, through a hollow portion of the female portion of the ball joint, and terminating in a plug which serves as a male port for connection to the camera.

According to another aspect of the invention, the male portion of the ball joint may include a single or multiple projection(s) extending therefrom and the female portion of the ball joint includes a plurality of indentations, the single or multiple projection(s) fitting within any one or more of a desired one or more of the plurality of indentations in order to position the male portion of the ball joint and its attached camera holder at a desired position relative to the user.

According to another aspect of the invention, the camera extension apparatus may include a switch cover for covering the momentary actuator switch. The two part housing nay include an anterior handle portion and a posterior handle portion such that the switch cover extends through an opening in the anterior portion, and wherein the anterior and the posterior portions are fixedly attached to one another to secure and encapsulate the circuit board and wire.

According to another aspect of the invention, the camera extension apparatus may include a mounting bracket attached to the two part housing and to the circuit board for protecting and securing the circuit board and the momentary actuator switch.

According to another aspect of the invention, the wire may include a first wire segment and a second wire segment connected together by a joint, such that the first wire segment is connected to the circuit board and has a thinner insulation than the second wire segment which is connected to the port.

According to another aspect of the invention, the camera integrated digital device may have a female port accepting a 3.5 mm 4 pole male headphone jack plug. The plug for connection to the camera may be a 3.5 mm 4 pole male headphone jack. The first and second wire segments are of sufficient conductivity and gage to operatively relay data from the circuit board to the camera integrated digital device when the plug for connection to the camera is inserted into the female port of the camera integrated digital device.

According to another aspect of the invention, the anterior and posterior portions of the two part handle may be connected together via a mechanical fastening mechanism and the mounting bracket may be attached to the posterior portion of the two part handle via a mechanical fastening mechanism.

According to another aspect of the invention the anterior and posterior portions of the two part handle may be connected together via a chemical adhesive and the mounting bracket may be attached to the posterior portion of the two part handle via a chemical adhesive.

According to another aspect of the invention, the joint connecting the first wire segment and the second wire segment may also function to secure the wire within the female portion of the ball joint.

According to another aspect of the invention, the first wire segment is of sufficient length to extend from the circuit board to the joint when the apparatus is in the fully extended position.

According to another aspect of the invention, when the apparatus is in the collapsed position, excess wire of the first wire segment is stored inside of the telescoping extension.

According to another embodiment of the invention, the excess wire may be coiled around a retracting wire spool housed in the two part handle.

According to one embodiment of the invention, the camera extension apparatus may include a two part ball joint attached to a camera holder at the terminal end of the telescopic monopod device.

According to another aspect of the invention, the ball joint may be created as a two part system that allows the user to manually adjust the angle of the camera quickly and easily, without fasteners or any tightening mechanism.

According to another aspect of the invention, the ball joint may be molded in such a way that multiple angles can be achieved and remain intact by virtue of an indent and projection system, or multiple indents and projections, molded into the corresponding Female and Male Ball Joint components.

According to a method of operating the apparatus of the invention, one of the initial steps may include providing a digital camera integrated device having a female port accepting a 3.5 mm 4 pole male headphone jack, a plurality of edges, and a camera function. Another of the initial steps may include providing a camera extension apparatus. A next step may include placing the digital camera integrated device into the camera holder of the camera extension apparatus. A next step may include aligning the corners of the digital camera integrated device under the plurality of holder edges of the camera holder of the camera extension apparatus. A next step may include inserting the plug of the camera extension apparatus into the female port of the digital camera integrated device. A next step may include actuating a power switch on the digital camera integrated device and actuating the camera function of the digital camera integrated device. A next step may include adjusting the angle of the multiple position ball joint to a desired angle and extending the telescoping extension of the camera extension apparatus to a desired distance from the handle of the camera extension apparatus. A next step may include actuating the momentary switch of the camera extension device to operate a shutter of the camera function of the digital camera integrated device. A final step may include capturing and storing a photo image in the digital camera integrated device.

BRIEF DESCRIPTION OF THE DRAWINGS

The present invention is best understood when the following detailed description of the invention is read with reference to the accompanying drawing, in which:

FIG. 10 is a top view of the female portion of the ball joint showing the recessed indents;
FIG. 11 is a side view of the female portion of the ball joint;
FIG. 12 is a side view of the female portion of the ball joint showing the recessed indents and the wire channel;
FIG. 13 is a side view of the female portion of the ball joint showing the wire channel;
FIG. 14 is a perspective view of the female portion of the ball joint showing the recessed indents and the wire channel;
FIG. 15A is a perspective view of the camera holder portion of the camera extension apparatus;
FIG. 15 B is a perspective view of the male portion of the ball joint showing a plurality of raised tabs;
FIG. 16 is a perspective view of the camera holder portion of the camera extension apparatus;
FIG. 17 is a perspective view of the camera holder portion of the camera extension apparatus;
FIG. 18 is a perspective view of the camera holder portion of the camera extension apparatus;
FIG. 19A is a perspective view of the camera holder portion of the camera extension apparatus;
FIG. 19B is a perspective view of the male portion of the ball joint showing a single raised tab;
FIG. 20 is a perspective view of the camera holder portion of the camera extension apparatus;
FIG. 21 is a perspective view of the camera holder portion of the camera extension apparatus;
FIG. 22 is a perspective view of the camera holder portion of the camera extension apparatus.

DETAILED DESCRIPTION

Figure 1:
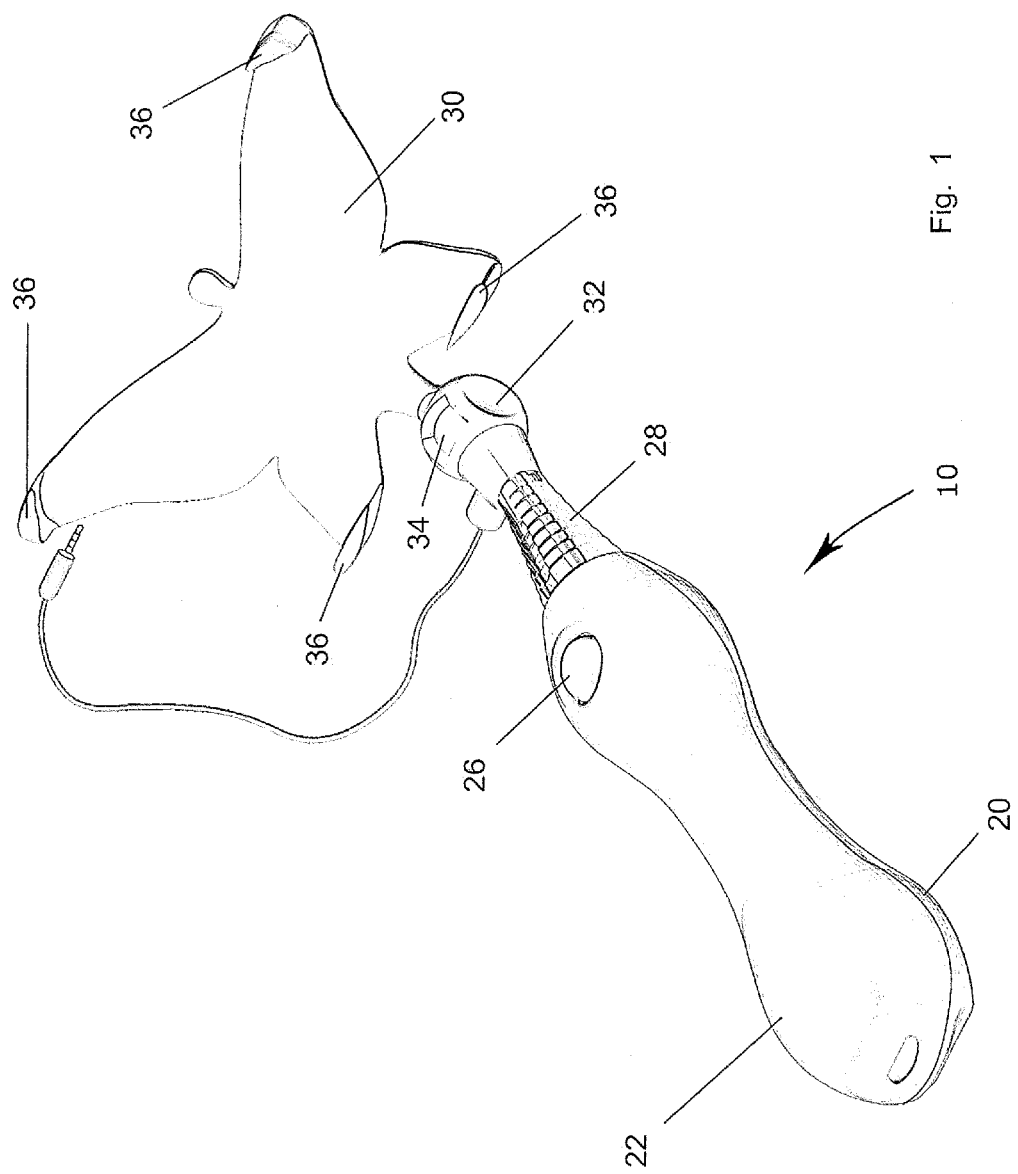
FIG. 1 is a perspective view of the apparatus in the collapsed position.
Figure 2:
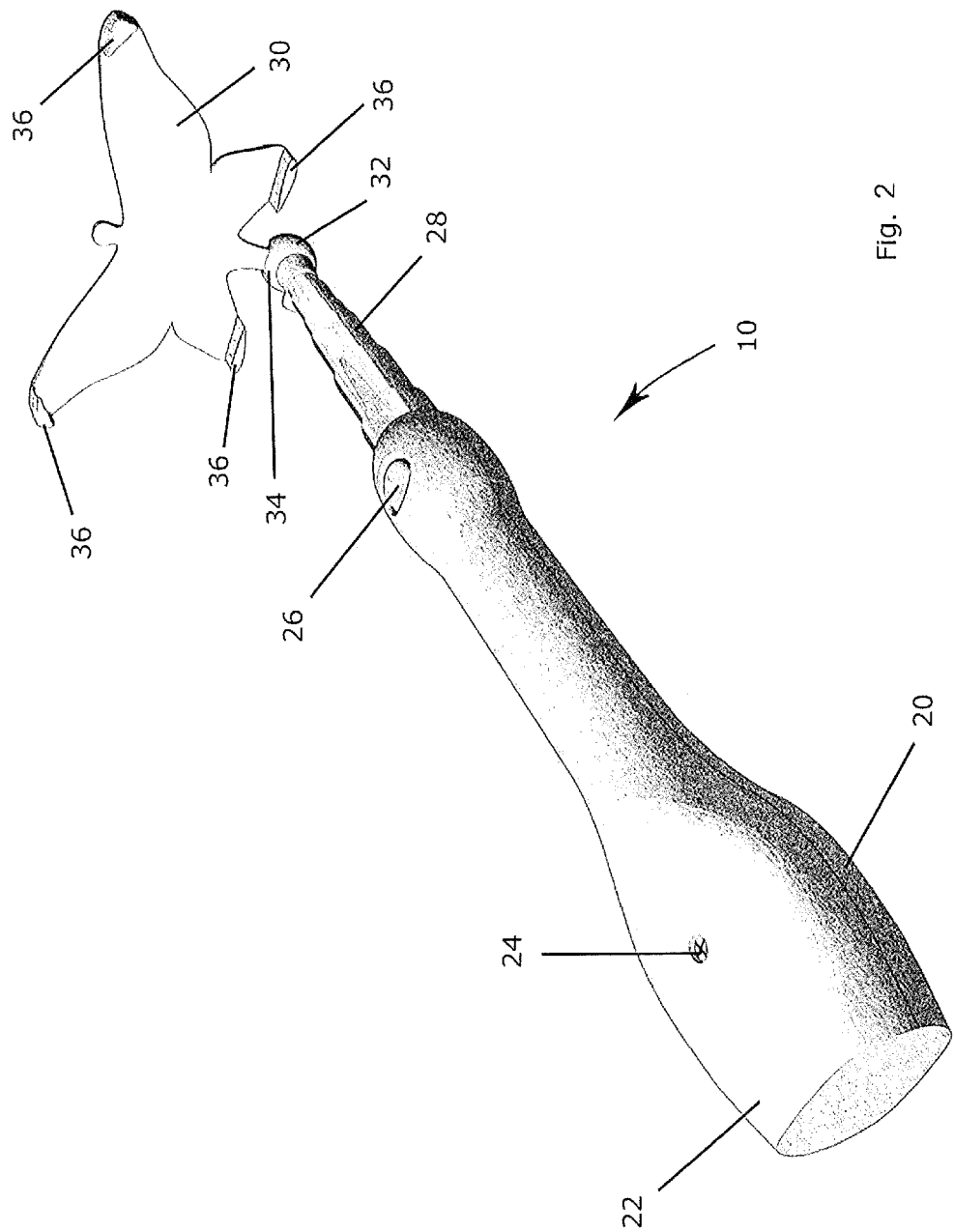
FIG. 2 is a perspective view of the apparatus in a partially extended position.
Figure 3:
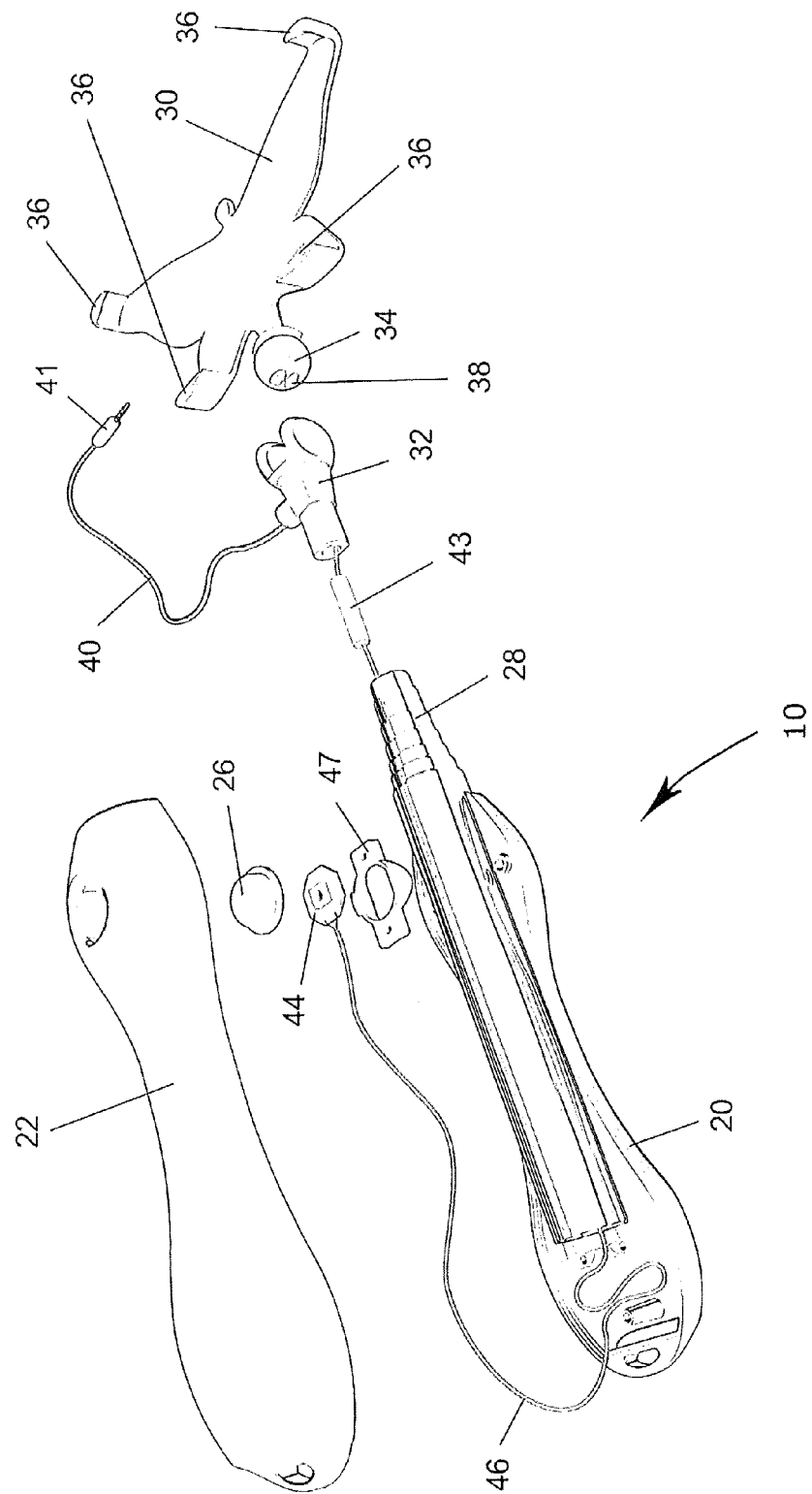
FIG. 3 is an exploded perspective view of the apparatus.
Figure 4:
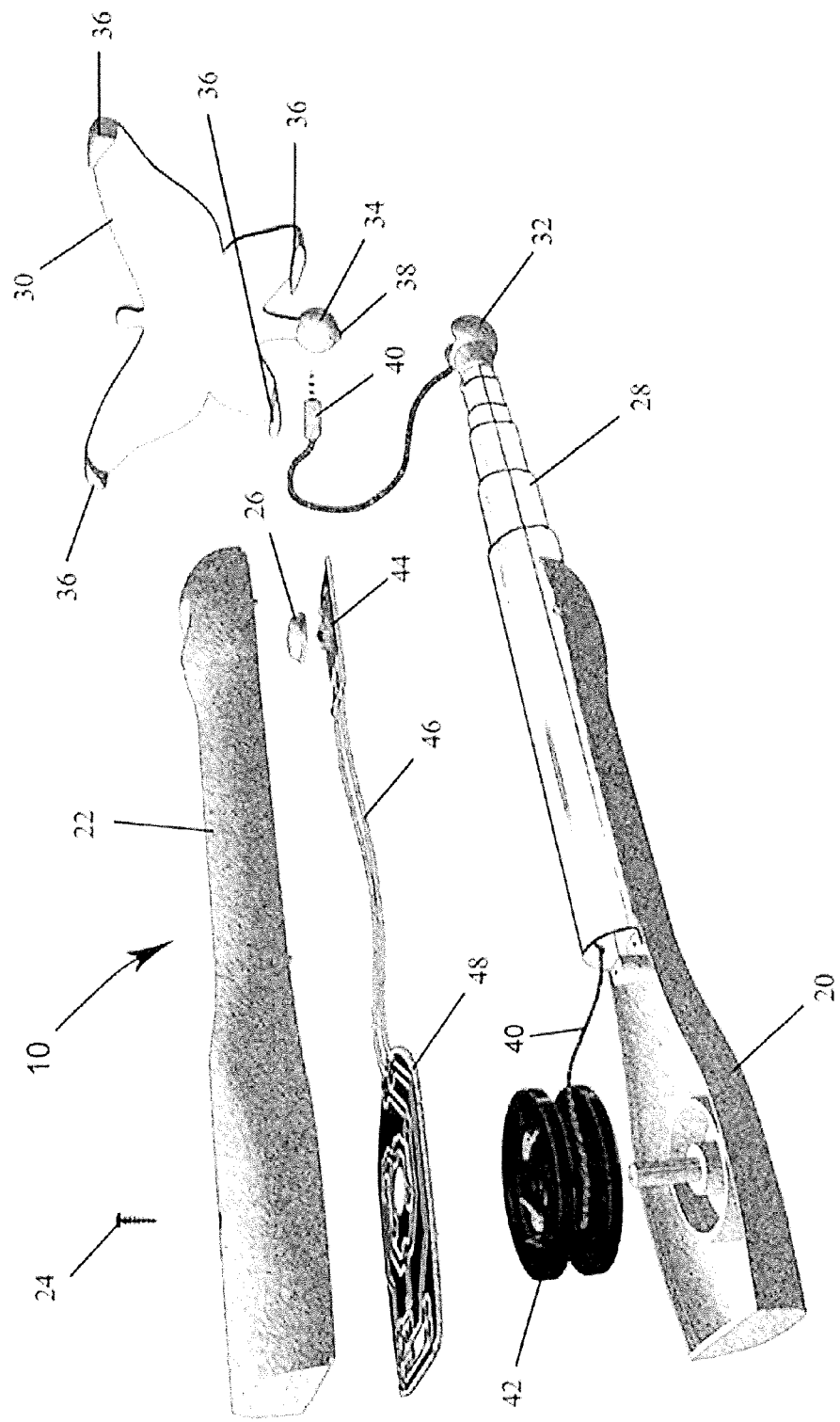
FIG. 4 is an exploded perspective view of the apparatus.
Figure 6:
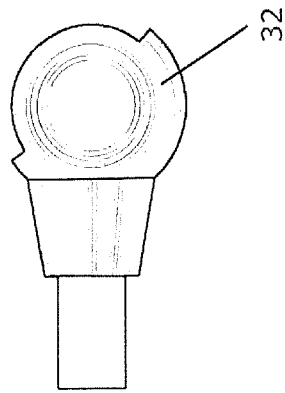
FIG. 6 is a side view of the female portion of the ball joint.
Figure 9:
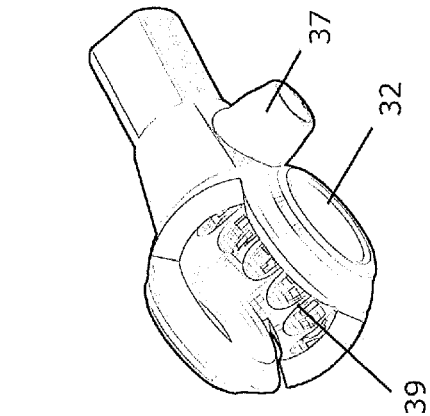
FIG. 9 is a perspective view of the female portion of the ball joint showing the recessed indents.
Figure 8:
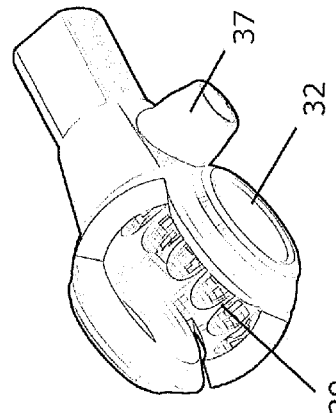
FIG. 8 is a side view of the female portion of the ball joint.
Figure 5:
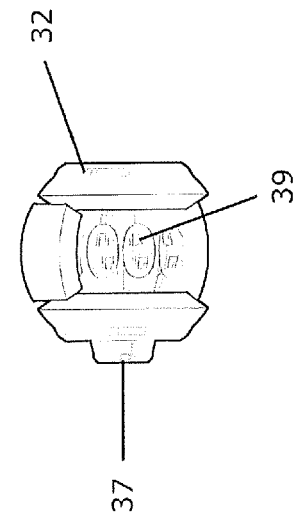
FIG. 5 is a top view of the female portion of the ball joint showing the recessed indents.
Figure 7:
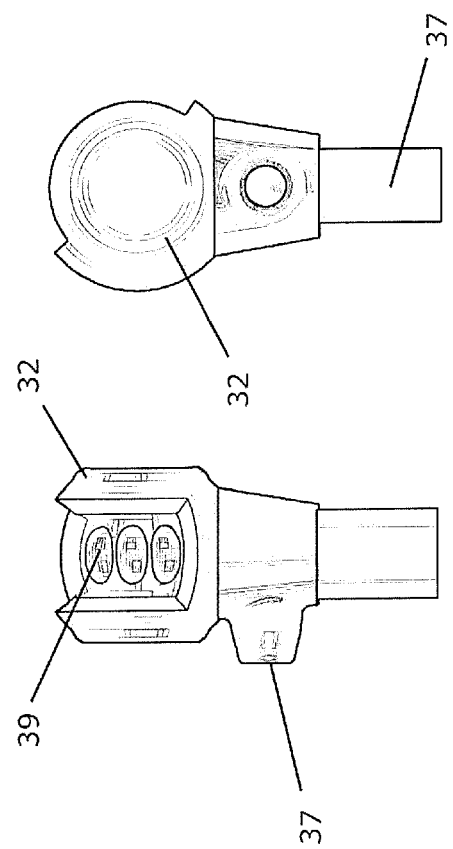
FIG. 7 is a is a side view of the female portion of the ball joint showing the recessed indents.
Figure 24:
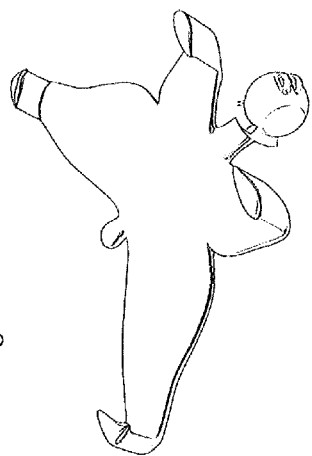
FIG. 24 is a perspective view of the camera holder portion of the camera extension apparatus.
Figure 26:
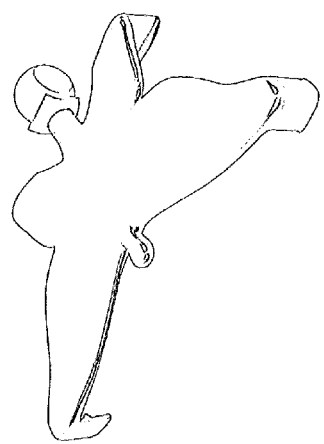
FIG. 26 is a perspective view of the camera holder portion of the camera extension apparatus.
Figure 23:
FIG. 23 is a perspective view of the camera holder portion of the camera extension apparatus.
Figure 25:
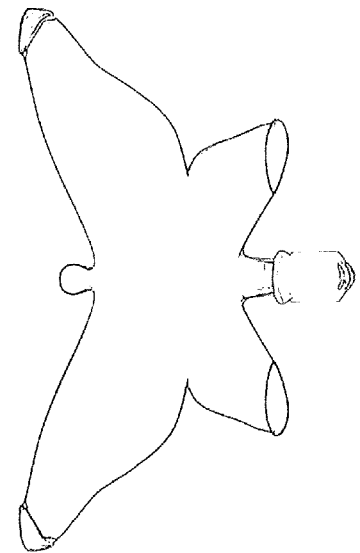
FIG. 25 is a perspective view of the camera holder portion of the camera extension apparatus.
Figure 27:
FIG. 27 is a perspective view of the camera holder portion of the camera extension apparatus.
Figure 28:
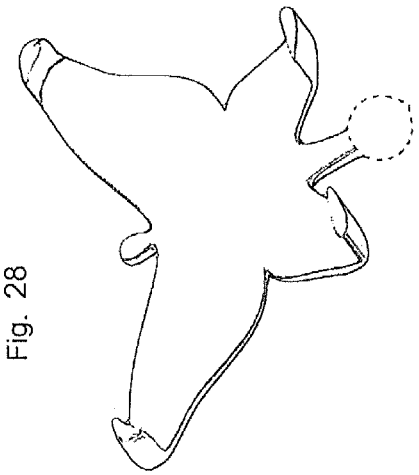
FIG. 28 is a perspective view of the camera holder portion of the camera extension apparatus.
Figure 29:
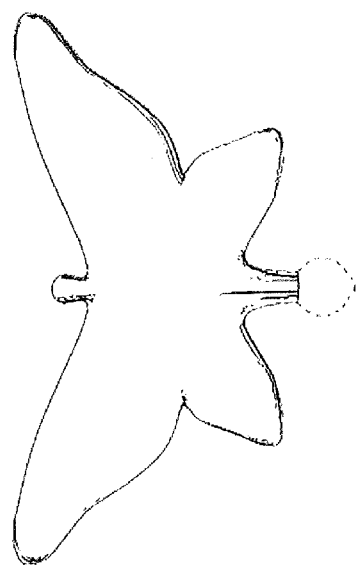
FIG. 29 is a perspective view of the camera holder portion of the camera extension apparatus.
Figure 30:
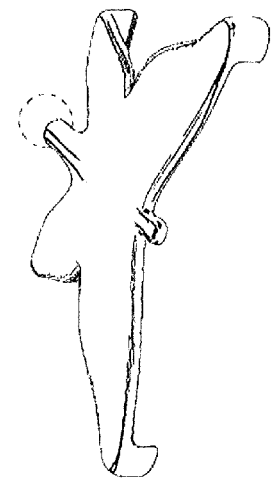
FIG. 30 is a perspective view of the camera holder portion of the camera extension apparatus.

Referring now specifically to the drawings, a Camera Extension Apparatus is shown generally at reference numeral 10. As shown in FIGS. 1-4, the invention includes of an anterior handle portion 22 and posterior handle portion 20 of a handle assembly. The handle assembly could be made from any number or materials such as metal, plastic, wood, ceramic, or other composite materials. Likewise, the handle may be made in one or more sections. The anterior 22 and posterior 20 portions mate together by virtue of a screw 24, as best shown in FIGS. 2 and 4, or any other chemical or mechanical fastening means. Also, the sections 22, 20 may mate together using corresponding posts, indentations or tabs either molded or fastened into each portion of the complete handle assembly.

The two part handle assembly further includes a momentary contact actuator switch 44 and a button cover 26 which seats inside a molded or stamped opening within the anterior portion of the handle assembly 22. The momentary contact actuator switch 44 is fixedly attached to a small circuit board as shown in FIG. 3. The switch 44 and circuit board are ideally located so that the user can hold the handle with one hand and depress the switch 44 via the cover 26 using their thumb. The switch and circuit board could also be located on the posterior 20 of the handle allowing the user to use his fingers or by using a squeeze trigger or the like. The circuit board is held in place by a mounting bracket seat 47. The handle portions 22, 20 is represented in the current embodiment to be straight in line with the telescoping support 28, but could be created at any angle to increase ergonomic or visual appeal. The telescoping support 28 may have as many sections of various lengths as is necessary to provide the desired distance from the user. The proximal or outermost section of the telescoping support 28 is partially housed inside the complete handle assembly 22, 20 and is adhered in position by a chemical adhesive or other mechanical means.

As best shown in FIG. 4, in an alternate embodiment, a second circuit board 48 is connected to the switch 44 by a two conductor cable 46. Such an embodiment may also include a spring loaded retracting wire spool 42. This wire spool 42 is housed in between the distal portion of the two halves of the handle assembly 22, 20 as shown in FIG. 4. The spool 42 stores the wire 40. As the user extends or retracts the telescoping support 28, the conductor cable 40 on the distal end of a jack 41, such as a 15 mm 4 pole male headphone jack, automatically unwinds and rewinds the wire 40 on the spool 42. The distal end of the wires 40 are soldered or affixed mechanically or in some other way to contact points on the exterior of the spool 42. The circuit board 48 may also be hard wired directly to the camera from either the interior or the exterior of a fixed or extension support. The spool 42 contains two contact points on its exterior. These make contact with two circular metal rings which are integrated on the circuit board 48 which also attach to the headphone jack 41 by two of its 4 conductors thus completing the circuit to the terminal end. The other two conductors are not used and can be clipped off or taped back. The terminal end of the wire 40, the jack 41, is plugged into the camera device such as an iPhone or iPod or similar integrated camera digital device via its headphone or auxiliary port in order to actuate the camera via the switch 44 and switch cover 26.

As shown in FIG. 3, rather than incorporating the spool, in the preferred embodiment, the 2 conductor cable 46 is directly routed from the small circuit board and switch 44 through the telescoping support 28. The wire is then routed through the hollow channel 37 of the female ball joint 32 and terminating at the jack 41. See FIGS. 5-14. Rather than storage on the spool as in FIG. 4, sufficient length of 2 conductor cable 46 is stored within the support 28 to allow for full extension as shown in FIG. 3.

The female portion of the ball joint 32, as best seen in FIGS. 5-14, is molded with a post that fits snugly into the distal end of the telescoping support 28 and can be held in place with a chemical adhesive or other mechanical fastening means. The female ball joint 32 can be made of various materials, and is hollow in structure so as to create a channel 37 for the wire 40 to travel down the telescoping support 28. The female ball joint 32 mates with the male ball joint 34, as seen in FIGS. 15B and 19B, by manually forcing the male portion 34 into the female portion 32. Corresponding indentations 39 on the female portion 32 and a single or multiple projection(s) 38 on the male portion 34 allow the user to adjust the camera holder 30 to a particular angle while maintaining the desired angle without undesired rotation due to the weight of the camera device or through unintended physical shock or vibration. The camera holding device 30 is molded directly onto the anterior portion of male ball joint 34, but could be separate and connected by a variety of chemical or mechanical fastening means.

According to one method of constructing the device as shown in FIG. 4, a manufacturer would design a handle assembly in two parts 20, 22 and have it molded in plastic or another comparable material. They would then mount a manufactured circuit board 48 to the distal end of the anterior portion 22 of the handle with chemical adhesive or mechanical fastening mechanism. They would also adhere the momentary switch 44 in its desired position in like manner. Wiring 46 would be soldered to the switch 44 and run the length of the anterior handle 22 in a groove and then be soldered to the circuit board 48. A button cover 26 would be placed between the momentary switch 44 and the anterior portion 22 of the handle to cover and protect the switch 44 while creating a more ergonomic and appealing feel. The segmented telescoping support 28 would then be mounted to the interior of the posterior 20 portion of the handle assembly 20, 22 using chemical adhesive. The female 32 and male 34 portions of the ball joint would be manually forced together and the female 32 portion would be adhered to the end of the support with adhesive via its integrated post. The headphone jack 41 conductor cable 40, such as a 3.5 mm 4 pole male headphone jack 41 conductor cable, would be fed through a hole 37 in female ball joint post and down through the support terminating at the spring loaded retracting wire spool 42. The wire lead from the headphone jack 41 would be soldered to the spool 42, the spool 42 would be wound and placed in position at the distal end of the handle 20, 22 assembly. The handle assembly sections 20, 22 would be pressed together and secured with a screw 24 at the distal end. Chemical adhesive could also be-used for this purpose.

According to one method of manufacturing the device shown in FIG. 2, a manufacturer would design a handle assembly in two parts 20, 22 and have it molded in plastic or another comparable material. They would then mount a circuit board with a momentary switch 44 within a mounting bracket 47 and adhered at the desired location within the anterior portion 22 of the handle with chemical adhesive or mechanical fastening mechanism. A two conductor Wire 46 would be soldered to the circuit board 44 and run the length of the anterior handle 22 in a groove and then routed through the hollow support 28. A button cover 26 would be placed between the momentary switch 44 and the anterior portion 22 of the handle to cover and protect the switch 44 while creating a more ergonomic and appealing feel. The segmented telescoping support 28 would then be mounted to the interior of the posterior 20 portion of the handle assembly 20, 22 using chemical adhesive. The female 32 and male 34 portions of the ball joint would be manually forced together and the female 32 portion would be adhered to the end of the support with adhesive via its integrated post. The headphone jack 41 conductor cable 40, such as a 3.5 mm 4 pole male headphone jack 41 conductor cable, would be fed through a hole 37 in the female ball joint post and down through the support and being joined to the two conductor wire 46 by soldering or other mechanical means 43. The handle assembly sections 20, 22 would be pressed together and secured with a screw 24 at the distal end. Chemical adhesive could also be-used for this purpose as could ultrasonic welding.

The momentary contact switch 44 can be moved to any part of the handle 20, 22 or it could be extended away from the handle with a cable that would allow the user to trigger the mechanism with their opposite hand or it would allow another person to trigger the device. Also, the segmented telescoping support 28 can come in various lengths and segments thus allowing additional distances of reach for the user. In an alternate embodiment, the support 28, rather than telescoping, could also be a fixed length, thus eliminating the use of the spring loaded retracting wire spool 42 as in FIG. 4 or the storage area inside the telescoping support 28 as in FIG. 2.

A user of this invention would place their camera integrated digital device into the device holder 30, secured with holder edges 36, and plug in the headphone jack 41. Because the holder edges 36 fit closely around the camera, there is no need for a mounting screw or other attachment of the camera to the extension device. Following securing the holder 30 to the camera, a user would then extend the segmented telescoping support 28 to the desired distance to allow for unobstructed photos or video to be taken.

This invention allows the user to take photos or video from an elevated or decreased height at will. It would allow a person to record events over a crowd or peer into spaces that they cannot reach due to physical constraints such as height of stature and arm length. It would also be helpful for self-portraits or pictures of large groups or when background is desired in the shot. The function of having an integrated push button in the handle allows the user to specify timing of a picture or video rather than to rely on the camera's self-timer or remote control device, or audio controls which would not behave ideally in noisy conditions. There are no additional power inputs required, so there are advantages over a remote control device that may require batteries to operate. Similarly, the device has advantages over a device that requires a bluetooth connection or other radio connection to the camera device.

A method and apparatus for extending a camera integrated digital device a distance away from a user 10 is described above with reference to specific embodiments and examples. Various details of the invention may be changed without departing from the scope of the invention. Furthermore, the foregoing description of the preferred embodiment of the invention and best mode for practicing the invention are provided for the purpose of illustration only and not for the purpose of limitation.

I claim:

1. A camera extension apparatus for extending and operating a digital camera integrated device beyond the reach of a user, comprising:
    a. a two part handle housing a momentary actuator switch operably connected to a single circuit board;
    b. a telescoping extension, attached to the two part handle and partially housed within the two part handle, extending from a collapsed position mostly within the two part handle to a fully extended position;
    c. a camera holder, having a plurality of holder edges sufficient to secure the digital camera integrated device at its edges;
    d. a multi-position ball joint connecting the camera holder to the telescoping extension and comprising a male portion of the ball joint attached to the camera holder and a female portion of the ball joint attached to the telescoping extension;
    e. a wire extending from the circuit board through a hollow portion of the telescoping extension, through a hollow portion of the female portion of the ball joint, and terminating in a plug for connection to the digital camera integrated device;
    a switch cover for covering the momentary actuator switch, wherein the two part handle comprises an anterior handle portion and a posterior handle portion and the switch cover extends through an opening in the anterior portion, and wherein the anterior and the posterior portions are fixedly attached to one another to secure and encapsulate the circuit board and wire;
    a mounting bracket attached to the two part handle and to the circuit board for protecting and securing the circuit board and the momentary actuator switch.

2. The camera extension apparatus of claim 1 wherein the male portion of the ball joint comprises a single or multiple projection(s) extending therefrom and the female portion of the ball joint includes a plurality of indentations, the single or multiple projection(s) fitting within any one or more of a desired one or more of the plurality of indentations in order to position the male portion of the ball joint and its attached camera holder at a desired position relative to the user.

3. The camera extension apparatus of claim 1 wherein the wire comprises a first wire segment and a second wire segment connected together by a joint, wherein the first wire segment is connected to the circuit board and has a thinner insulation than the second wire segment which is connected to the port.

4. The camera extension apparatus of claim 3 wherein:
    a. the digital camera integrated device has a female port accepting a 3.5 mm 4 pole male headphone jack;
    b. the plug for connection to the digital camera integrated device is a 3.5 mm 4 pole male headphone jack; and
    c. the first and second wire segments are of sufficient conductivity and gage to operatively relay data from the circuit board to the digital camera integrated device when the plug for connection to the digital camera integrated device is inserted into the female port of the digital camera integrated device.

5. The camera extension apparatus of claim 4 wherein the joint connecting the first wire segment and the second wire segment secures the wire within the female portion of the ball joint.

6. The camera extension apparatus of claim 5 wherein the first wire segment is of sufficient length to extend from the circuit board to the joint when the apparatus is in the fully extended position.

7. The camera extension apparatus of claim 6 wherein, when the apparatus is in the collapsed position, excess wire of the first wire segment is stored inside of the telescoping extension.

8. The camera extension apparatus of claim 1 wherein the anterior and posterior portions of the two part handle are connected together via a mechanical fastening mechanism and the mounting bracket is attached to the anterior portion of the two part handle via a mechanical fastening mechanism.

9. The camera extension apparatus of claim 1 wherein the anterior and posterior portions of the two part handle are connected together via a chemical adhesive and the mounting bracket is attached to the anterior portion of the two part handle via a chemical adhesive.

10. A camera extension apparatus for extending and operating a digital camera integrated device beyond the reach of a user, comprising:
  a. a two part handle comprising an anterior handle portion fixedly attached to a posterior handle portion;
  b. a mounting bracket, attached to the anterior handle portion, securing a momentary actuator switch operably connected to a single circuit board, the actuator switch being protected by a switch cover extending through the anterior handle portion;
  c. a telescoping extension, attached to the two part handle and partially housed within the two part handle, extending from a collapsed position mostly within the two part handle to a fully extended position;
  d. a camera holder, having a plurality of holder edges sufficient to secure the digital camera integrated device at its edges;
  e. a multi-position ball joint connecting the camera holder to the telescoping extension and comprising a male portion of the ball joint attached to the camera holder and a female portion of the ball joint attached to the telescoping extension, wherein the male portion of the ball joint comprises a single or multiple projection(s) extending therefrom and the female portion of the ball joint includes a plurality of indentations, the single or multiple projection(s) fitting within any one or more of a desired one or more of the plurality of indentations in order to position the male portion of the ball joint and its attached camera holder at a desired position relative to the user;
  f. a wire extending from the circuit board through a hollow portion of the telescoping extension, through a hollow portion of the female portion of the ball joint, and terminating in a plug for connection to the digital camera integrated device; and
  g. wherein:
    i. the digital camera integrated device has a female port accepting a 3.5 mm 4 pole male headphone jack;
    ii. the plug for connection to the digital camera integrated device is a 3.5 mm 4 pole male headphone jack; and
    iii. the first and second wire segments are of sufficient conductivity and gage to operatively relay data from the circuit board to the digital camera integrated device when the plug for connection to the digital camera integrated device is inserted into the female port of the digital camera integrated device.

11. The camera extension apparatus of claim 10 wherein the anterior and posterior portions of the two part handle are connected together via a mechanical fastening mechanism and the mounting bracket is attached to the anterior portion of the two part handle via a mechanical fastening mechanism.

12. The camera extension apparatus of claim 10 wherein the anterior and posterior portions of the two part handle are connected together via a chemical adhesive and the mounting bracket is attached to the anterior portion of the two part handle via a chemical adhesive.

13. The camera extension apparatus of claim 10 wherein the joint connecting the first wire segment and the second wire segment secures the wire within the female portion of the ball joint.

14. The camera extension apparatus of claim 13 wherein the first wire segment is of sufficient length to extend from the circuit board to the joint when the apparatus is in the fully extended position.

15. The camera extension apparatus of claim 14 wherein, when the apparatus is in the collapsed position, excess wire of the first wire segment is stored inside of the telescoping extension.

16. A method of extending and operating a digital camera integrated device beyond the reach of a user comprising the steps of:
  a. providing a digital camera integrated device having a female port accepting a 3.5 mm 4 pole male headphone jack, a plurality of edges, and a camera function;
  b. providing a camera extension apparatus comprising:
    i. a handle housing a momentary actuator switch operably connected to a single circuit board,
    ii. a telescoping extension, attached to the handle and partially housed within the handle, extending from a collapsed position mostly within the handle to a fully extended position,
    iii. a camera holder, having a plurality of holder edges sufficient to secure the digital camera integrated device at its edges,
    iv. a multi-position ball joint connecting the camera holder to the telescoping extension and having a male portion of the ball joint attached to the camera holder and a female portion of the ball joint attached to the telescoping extension, and
    v. a wire extending from the circuit board through a hollow portion of the telescoping extension, through a hollow portion of the female portion of the ball joint, and terminating in a plug which comprises a 3.5 mm 4 pole male headphone jack;
  c. placing the digital camera integrated device into the camera holder of the camera extension apparatus;
  d. aligning the corners of the digital camera integrated device under the plurality of holder edges of the camera holder of the camera extension apparatus;
  e. inserting the plug of the camera extension apparatus into the female port of the digital camera integrated device;
  f. actuating a power switch on the digital camera integrated device and actuating the camera function of the digital camera integrated device;
  g. adjusting the angle of the multiple position ball joint to a desired angle and extending the telescoping extension of the camera extension apparatus to a desired distance from the handle of the camera extension apparatus;
  h. actuating the momentary switch of the camera extension device to operate a shutter of the camera function of the digital camera integrated device; and
  i. capturing and storing a photo image in the digital camera integrated device.

17. The method of extending and operating a digital camera integrated device beyond the reach of a user of claim 16 wherein the male portion of the ball joint comprises a single or multiple projection(s) extending therefrom and the female portion of the ball joint includes a plurality of indentations, the single or multiple projection(s) fitting within any one or more of a desired one or more of the plurality of indentations in order to position the male portion of the ball joint and its attached camera holder at a desired position relative to the user.

18. The method of extending and operating a digital camera integrated device beyond the reach of a user of claim 17 wherein:
  a. the wire comprises a first wire segment joined at a joint to a second wire segment, the joint securing the wire within the female portion of the ball joint;
  b. the first and second wire segments are of sufficient conductivity and gage to operatively relay data from the circuit board to the digital camera integrated device when the plug for connection to the digital camera integrated device is inserted into the female port of the digital camera integrated device; and c. the handle comprises an anterior and a posterior portion fixedly attached to each other and protecting the circuit board and wire from an external environment.

* * * * *